(12) United States Patent
Li

(10) Patent No.: US 11,929,902 B2
(45) Date of Patent: Mar. 12, 2024

(54) PCIe SIGNAL BANDWIDTH DETERMINING METHOD, APPARATUS AND DEVICE

(71) Applicant: INSPUR SUZHOU INTELLIGENT TECHNOLOGY CO., LTD., Jiangsu (CN)

(72) Inventor: Jian Li, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/039,831

(22) PCT Filed: Nov. 30, 2021

(86) PCT No.: PCT/CN2021/134339
§ 371 (c)(1),
(2) Date: Jun. 1, 2023

(87) PCT Pub. No.: WO2023/010729
PCT Pub. Date: Feb. 9, 2023

(65) Prior Publication Data
US 2023/0388209 A1  Nov. 30, 2023

(30) Foreign Application Priority Data
Aug. 4, 2021  (CN) .......................... 202110888725.9

(51) Int. Cl.
*H04L 43/0894* (2022.01)
*G06F 13/42* (2006.01)
(52) U.S. Cl.
CPC ...... *H04L 43/0894* (2013.01); *G06F 13/4282* (2013.01); *G06F 2213/0026* (2013.01)

(58) Field of Classification Search
CPC ............ H04L 43/0894; G06F 13/4282; G06F 2213/0026
USPC ....................................................... 370/252
See application file for complete search history.

(56) References Cited

U.S. PATENT DOCUMENTS

2018/0003764 A1  1/2018  Menon et al.

FOREIGN PATENT DOCUMENTS

| CN | 101917358 A | 12/2010 |
|---|---|---|
| CN | 102420719 A | 4/2012 |
| CN | 107015086 A | 8/2017 |
| CN | 111858455 A | 10/2020 |
| CN | 111965529 A | 11/2020 |
| CN | 112416672 A | 2/2021 |

(Continued)

OTHER PUBLICATIONS

LeCroy Michael Lauterbach. "The choice of high bandwidth oscilloscope." Electronic Today. Dec. 10, 2005.

*Primary Examiner* — Gbemileke J Onamuti
(74) *Attorney, Agent, or Firm* — IPro, PLLC

(57) ABSTRACT

The present disclosure discloses a method for determining a PCIe signal bandwidth, apparatus and device, and a computer readable storage medium. A target frequency point at which the energy spectrum density of a PCIe signal of a transmission link to be measured, after an output signal of said transmission link is subjected to inverse Fourier transform, reaches a preset proportion (determined according to a measurement error requirement of said transmission link) of that of an original signal is obtained by testing, and the target frequency point is taken as a bandwidth of the PCIe signal of said transmission link. Therefore, accurate high-speed signal bandwidth selection is realized.

20 Claims, 3 Drawing Sheets

(56) References Cited

FOREIGN PATENT DOCUMENTS

| | | |
|---|---|---|
| CN | 112543066 A | 3/2021 |
| CN | 113347067 A | 9/2021 |
| EP | 1315303 A1 | 5/2003 |

PCIe SIGNAL BANDWIDTH DETERMINING METHOD, APPARATUS AND DEVICE

CROSS-REFERENCE TO RELATED APPLICATION

This application claims the priority of the Chinese Patent application filed on Aug. 4, 2021 before the China National Intellectual Property Administration with the application number of 202110888725.9, and the title of "METHOD FOR DETERMINING PCIE SIGNAL BANDWIDTH, APPARATUS AND DEVICE", which is incorporated herein in its entirety by reference.

FIELD

The present disclosure relates to the technical field of signal transmission and, more particularly, to a method for determining a PCIe signal bandwidth, an apparatus, a device, and a computer-readable storage medium.

BACKGROUND

In the low-speed era when a clock frequency is kHz or only tens of MHz, electronic engineers mainly focus on the design of circuit function and logic, and consider that "0" and "1" code streams may be accurately transmitted to a receiving end via a voltage or a current waveform, and is accurately judged by the receiving end. However, with the continuous improvement of a circuit working frequency, although information transmitted by the "0" and "1" code streams is digital, the voltage or the current waveform bearing the information is analog. Noise, loss, unstable power supply, and other factors may cause distortion of the voltage or the current waveform. If the distortion is serious to a certain extent, a receiver may misjudge "0" and "1" codes output by a transmitter, which is called a signal integrity problem.

The signal integrity problem is related to many factors, including frequency increase, rise time decrease, swing reduction, unsatisfactory interconnected channels, bad power supply environment, inconsistent delay between channels, and the like. However, the root cause of the signal integrity problem is mainly that the rise time of a signal decreases. When the rise time decreases, there may be more high-frequency components in the signal, and the interaction between the high-frequency components and the channels may cause serious distortion of the signal. An important content of signal integrity research is the influence of the interconnected channels on the signal. The interconnected channels have different responses to signals with different frequencies. Therefore, it is required to pay attention to the frequency domain response of signal analysis, which is essentially the process of inverse Fourier transform. Time domain waveforms may be obtained from signal spectra. For an ideal square wave signal, the rise time is 0, and each frequency component is necessary. Therefore, a bandwidth of the ideal square wave signal is infinite in theory. But in practical engineering application, since the rise time of the signal is limited, under the condition that a spectrum amplitude for a certain frequency component is small enough, contribution of the frequency component to waveform may be ignored. Then, the influence of the frequency component may be omitted. This is the fundamental reason for defining a signal bandwidth that a finite width spectrum is replaced with an infinite width spectrum, and then an acceptable approximation to an original signal is obtained in a time domain. The relationship between the signal bandwidth and the rise time is also the basis and premise of the signal integrity problem.

At present, there are many bandwidth selection rules for different application scenarios in the industry, for example, quintuple rule, triple sine wave frequency rule, 1.8-times rule, ⅓ rule, and the like. Currently, when using an oscilloscope to verify the integrity of high-speed signals, the triple sine wave frequency rule is basically followed. That is, a minimum bandwidth of the oscilloscope is required to be three times of the sine signal frequency. On the one hand, with the continuous updating and upgrading of wireless communication and electronic information products and the development of high-speed and high-frequency signal transmission, the speed of PCIe signals commonly used in the research and development fields of servers, computers, and memories is greatly increased from the first generation PCIe 1.0 (2.5 GT/s), to the second generation PCIe 2.0 (5.0 GT/s), to the third generation PCIe 3.0 (8.0 GT/s), to the fourth generation PCIe 4.0 (16 GT/s), to the fifth generation PCIe 5.0 (32 GT/s), and then to PCIe 6.0 (64 GT/s) that is about to be researched and developed and used. Accordingly, the production process of chip manufacturers is also continuously improved. For example, the current mainstream CPU manufacturer Intel chips are improved from the 32 nm process of the Romeley Platform, to the 22 nm process of the Grantley Platform, to the 14 nm process of the Purley Platform, to the 10 nm process of the Whitley Platform, and then to the current 7 nm process of the Eagalstream Platform. The channel length of transistors is greatly reduced, whereby the on-off time of the transistors is shorter, which also means that the signal rise time is shortened. In order to reduce costs and increase output, the chip manufacturers adopt standardized production methods. Devices even with very low speed may be processed by using an advanced production process which also leads to a shorter rise time of low-speed signals. According to the traditional triple sine wave frequency rule (3.5/Tr) in the engineering, this also means that bandwidth demands are also increasing.

However, meanwhile, under the condition that system manufacturers, for example, server industry, have more demands for peripherals (CEM), the channel loss is also increasing. After a signal at a transmitting end is subjected to a large link loss, a high-frequency signal received at a receiving end may be greatly suppressed, whereby the actual bandwidth demands often does not need to be as large as three times the sine wave frequency. Upon following the empirical rule, the measured signal-to-noise ratio of the signal is reduced (a higher bandwidth corresponds to a higher ground noise). On the other hand, oscilloscopes, which are required in the signal integrity verification, may be more and more expensive with the increase of the bandwidth. For example, the unit price of 50 GHz high-bandwidth precision oscilloscopes used at present has reached more than 5 million. In the process of product research and development, each company basically has a plurality of projects developed in parallel, which also leads to the frequent shortage of device resources per capita. If this problem is solved by purchasing a plurality of high-order oscilloscopes, it may inevitably bring greater research and development expenses to the company.

SUMMARY

The object of the present disclosure is to provide a method for determining a PCIe signal bandwidth, an apparatus, a device, and a computer-readable storage medium, which are used for accurately determining the bandwidth of PCIe signals, whereby circuit design problems may be more reliably located, and the problems of cost and signal-to-noise ratio reduction caused by oscilloscopes with excessive bandwidth may be avoided.

In order to solve the technical problem stated above, the present disclosure provides a method for determining a PCIe signal bandwidth, including:

obtaining, by pre-testing, an insertion loss of a standard PCIe signal on an analog transmission link;

determining an insertion loss of a to-be-tested transmission link;

according to a PCIe signal type of a PCIe signal to be transmitted by the to-be-tested transmission link and the insertion loss of the to-be-tested transmission link, determining a target analog transmission link for simulating the to-be-tested transmission link;

obtaining, by testing, a target frequency point at which energy spectrum density of an output signal, after being subjected to inverse Fourier transform, of the PCIe signal corresponding to the PCIe signal type passing the target analog transmission link reaches a preset proportion of an original signal of the PCIe signal type;

taking the target frequency point of the to-be-tested transmission link as a bandwidth of the PCIe signal of the to-be-tested transmission link;

wherein the preset proportion is determined according to a measurement error requirement of the to-be-tested transmission link.

In some embodiments, obtaining, by testing, the insertion loss of the standard PCIe signal on the analog transmission link includes:

obtaining, by testing, the insertion loss of the standard PCIe signal on each transmission link of an inter symbol interference board; and taking the insertion loss on each transmission link of the inter symbol interference board as the insertion loss of the standard PCIe signal on the analog transmission link.

In some embodiments, obtaining, by testing, an insertion loss of the standard PCIe signal on each transmission link of an inter symbol interference board includes:

measuring, by a vector network analyzer, an insertion loss of each frequency point corresponding to a PCIe signal compatible with the standard PCIe signal on each transmission link of the inter symbol interference board.

In some embodiments, obtaining, by testing, the target frequency point at which the energy spectrum density of the output signal, after being subjected to inverse Fourier transform, of the PCIe signal corresponding to the PCIe signal type passing the target analog transmission link reaches the preset proportion of the original signal of the PCIe signal type includes:

obtaining, by testing, the target frequency point at which the energy spectrum density of the output signal, after being subjected to inverse Fourier transform, of the PCIe signal corresponding to the PCIe signal type firstly being synthesized to be an interference signal by a synthesizer and then passing the target analog transmission link reaches the preset proportion of the original signal of the PCIe signal type.

In some embodiments, obtaining, by testing, the target frequency point at which the energy spectrum density of the output signal, after being subjected to inverse Fourier transform, of the PCIe signal corresponding to the PCIe signal type passing the target analog transmission link reaches the preset proportion of the original signal of the PCIe signal type includes:

introducing the PCIe signal corresponding to the PCIe signal type into a high-bandwidth oscilloscope via the target analog transmission link, and capturing a testing waveform;

performing Fourier transform on the testing waveform to obtain a frequency domain envelope curve graph of the testing waveform; and based on the frequency domain envelope curve graph, measuring the target frequency point at which the energy spectrum density of the output signal, after being subjected to inverse Fourier transform, of the PCIe signal corresponding to the PCIe signal type passing the target analog transmission link reaches the preset proportion of the original signal of the PCIe signal type.

In some embodiments, before, according to the PCIe signal type of the PCIe signal to be transmitted by the to-be-tested transmission link and the insertion loss of the to-be-tested transmission link, determining the target analog transmission link for simulating the to-be-tested transmission link, the method further includes:

judging whether a tested transmission link of a tested target frequency point with the same insertion loss as the insertion loss of the to-be-tested transmission link exists;

when the tested transmission link of the tested target frequency point with the same insertion loss as the insertion loss of the to-be-tested transmission link exists, after taking the target frequency point of the tested transmission link as the target frequency point of the to-be-tested transmission link, entering the step of taking the target frequency point of the to-be-tested transmission link as the bandwidth of the PCIe signal of the to-be-tested transmission link;

when the tested transmission link of the tested target frequency point with the same insertion loss as the insertion loss of the to-be-tested transmission link does not exist, entering the step of according to the PCIe signal type of the PCIe signal to be transmitted by the to-be-tested transmission link and the insertion loss of the to-be-tested transmission link, determining the target analog transmission link for simulating the to-be-tested transmission link;

after obtaining, by testing, the target frequency point at which the energy spectrum density of the output signal, after being subjected to inverse Fourier transform, of the PCIe signal corresponding to the PCIe signal type passing the target analog transmission link reaches the preset proportion of the original signal of the PCIe signal type, the method further includes:

storing a corresponding relationship between the insertion loss of the to-be-tested transmission link and the target frequency point of the to-be-tested transmission link.

In some embodiments, the determining the insertion loss of the to-be-tested transmission link includes:

determining the insertion loss of the to-be-tested transmission link by simulation testing through simulation software.

In some embodiments, the target analog transmission link is an analog transmission link with the same standard PCIe signal as the to-be-tested transmission link, wherein the analog transmission link has the same insertion loss as the to-be-tested transmission link.

In order to solve the technical problem stated above, the present disclosure further provides an apparatus for determining a PCIe signal bandwidth, including:

- a pre-testing unit configured to obtain, by pre-testing, an insertion loss of a standard PCIe signal on an analog transmission link;
- a first determining unit configured to determine an insertion loss of a to-be-tested transmission link;
- a second determining unit, configured to, according to a PCIe signal type of a PCIe signal to be transmitted by the to-be-tested transmission link and the insertion loss of the to-be-tested transmission link, determine a target analog transmission link for simulating the to-be-tested transmission link;
- a testing unit configured to obtain, by testing, a target frequency point at which energy spectrum density of an output signal, after being subjected to inverse Fourier transform, of the PCIe signal corresponding to the PCIe signal type passing the target analog transmission link reaches a preset proportion of an original signal of the PCIe signal type; and
- a matching unit configured to take the target frequency point of the to-be-tested transmission link as a bandwidth of the PCIe signal of the to-be-tested transmission link;
- wherein the preset proportion is determined according to a measurement error requirement of the to-be-tested transmission link.

In order to solve the technical problem stated above, the present disclosure further provides a device for determining a PCIe signal bandwidth, including:

- a memory configured to store an instruction including the steps of the method for determining the PCIe signal bandwidth according to any one of embodiments stated above; and
- a processor configured to execute the instruction.

In order to solve the technical problem stated above, the present disclosure further provides a computer-readable storage medium storing a computer program thereon, wherein when executed by a processor, the computer program implements the steps of the method for determining the PCIe signal bandwidth according to any one of embodiments stated above.

The present disclosure provides a method for determining a PCIe signal bandwidth. By testing, a target frequency point at which energy spectrum density of an output signal, after being subjected to inverse Fourier transform, of the PCIe signal corresponding to the PCIe signal type passing the target analog transmission link reaches a preset proportion (determined according to a measurement error requirement of the to-be-tested transmission link) of an original signal of the PCIe signal type is obtained and the target frequency point is taken as a bandwidth of the PCIe signal of the to-be-tested transmission link. Therefore, accurate high-speed signal bandwidth selection is realized. Moreover, in order to measure the target frequency point, after a high-speed signal is subjected to a large link loss, a high-frequency signal received at a receiving end may be greatly suppressed. Therefore, the insertion loss of the standard PCIe signal on the analog transmission link is obtained by pre-testing, and after the insertion loss of the to-be-tested transmission link is determined, a target analog transmission link is selected to simulate the to-be-tested transmission link for testing. The test of signal bandwidth selection in the design stage of the to-be-tested transmission link is realized, and reasonable selection of the PCIe signal bandwidth is accordingly realized.

The present disclosure also provides an apparatus for determining a PCIe signal bandwidth, a device and a computer-readable storage medium, which have the foregoing beneficial effects. Detailed descriptions are omitted herein.

BRIEF DESCRIPTION OF THE DRAWINGS

In order to explain the embodiments of the present disclosure or the technical solutions in the prior art more clearly, a brief description may be given below with reference to the accompanying drawings which are used in the description of the embodiments or the prior art, and it is obvious that the drawings in the description below are merely some embodiments of the present disclosure, and a person skilled in the art may obtain other drawings according to these drawings without involving any inventive effort.

DETAILED DESCRIPTION

The core of the present disclosure is to provide a method for determining a PCIe signal bandwidth, an apparatus, a device, and a computer-readable storage medium, which are used for accurately determining the bandwidth of PCIe signals, whereby circuit design problems may be more reliably located, and the problems of cost and signal-to-noise ratio reduction caused by oscilloscopes with excessive bandwidth may be avoided.

It may be seen that the manner of selecting PCIe signal bandwidths by an empirical method has increasingly exposed the problem of unreasonable bandwidth setting. How to accurately determine the bandwidth of PCIe signals is a technical problem that needs to be solved by those skilled in the art.

In the following, the technical solution of the embodiment of the present disclosure may be clearly and completely described in combination with the drawings of the embodiment of the present disclosure. Obviously, the embodiment described is only a part of the embodiments of the present disclosure, not the whole embodiments. Based on the embodiments in the present disclosure, all other embodiments obtained by a person of ordinary skill in the art without making creative labor belong to the scope of protection of the present disclosure.

Figure 1:
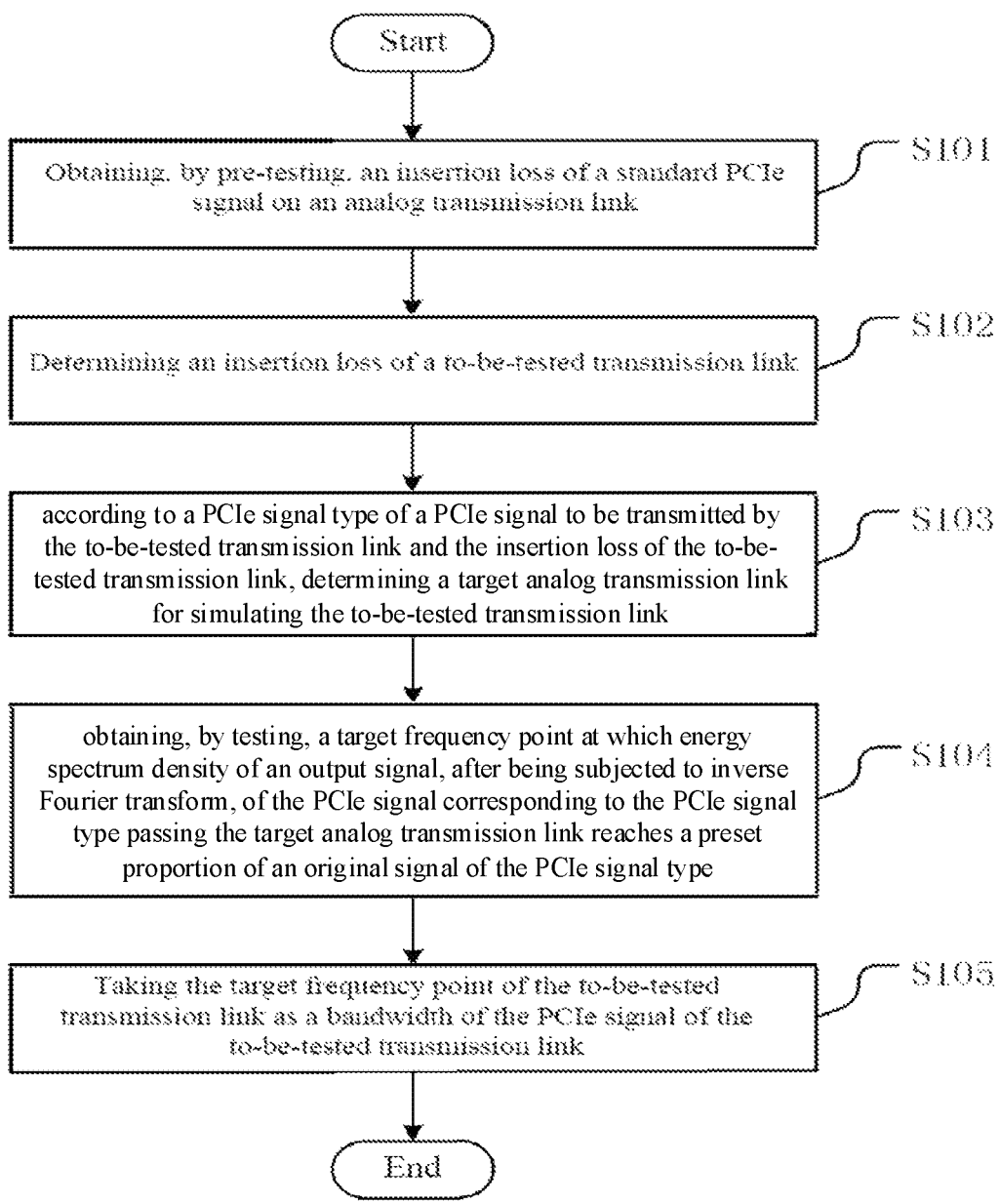
FIG. 1 is a flowchart of a method for determining a PCIe signal bandwidth according to an embodiment of the present disclosure.
Figure 2:
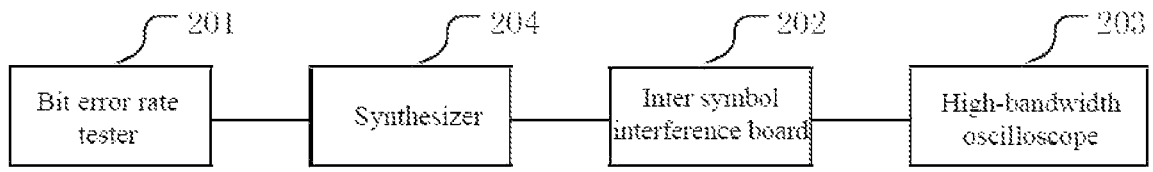
FIG. 2 is a schematic diagram showing a structure of a testing system for a target frequency point according to an embodiment of the present disclosure.

FIG. 1 is a flowchart of a method for determining a PCIe signal bandwidth according to an embodiment of the present disclosure. FIG. 2 is a schematic diagram showing a structure of a testing system for a target frequency point according to an embodiment of the present disclosure.

As shown in FIG. 1, the method for determining the PCIe signal bandwidth according to an embodiment of the present disclosure includes:

S101: obtaining, by pre-testing, an insertion loss of a standard PCIe signal on an analog transmission link;

S102: determining an insertion loss of a to-be-tested transmission link;

S103: according to a PCIe signal type of a PCIe signal to be transmitted by the to-be-tested transmission link and the insertion loss of the to-be-tested transmission link, determining a target analog transmission link for simulating the to-be-tested transmission link;

S104: obtaining, by testing, a target frequency point at which energy spectrum density of an output signal, after being subjected to inverse Fourier transform, of the PCIe signal corresponding to the PCIe signal type passing the target analog transmission link reaches a preset proportion of an original signal of the PCIe signal type; and S105: taking the target frequency point of the to-be-tested transmission link as a bandwidth of the PCIe signal of the to-be-tested transmission link.

The preset proportion is determined according to a measurement error requirement of the to-be-tested transmission link.

Under the condition that the signal rise time is reduced with the continuous increase of signal rate and the continuous improvement of chip processing technology and the system manufacturers such as the server industry peripherals (CEM) demand configuration is more, the insertion loss of the PCIe signal transmission link is also increasing (for example, a PCIe 3.0 full-channel insertion loss is expected to be 22 dB, a PCIe 4.0 full-channel insertion loss is expected to be 28 dB, and a PCIe 5.0 full-channel insertion loss is expected to be 36 dB) at a same time. The selection of the PCIe signal bandwidth according to the empirical rule often does not meet actual needs of the PCIe signals. Generally, the bandwidth selected by the empirical method may be higher than the bandwidth required by the PCIe signals, resulting in that the signal-to-noise ratio of the signal measured in subsequent tests is reduced, and a test device is highly required. When the signal rate rises to 32 Gb/s, a high-frequency signal received at the receiving end may be greatly suppressed after being subjected to a large link loss through a transmitting end. Experiments show that with the increase of the transmission link length, high-frequency signals contained in the PCIe signal received at the receiving end may be gradually reduced, and the required bandwidth may be gradually reduced. An insertion loss (IL) refers to a load power loss caused by the insertion of a component or device somewhere in a transmission system, which is expressed as the ratio of the power received on the load before the component or device is inserted to the power received on the same load after insertion in decibels. In an embodiment of the present disclosure, in the case that the PCIe signal type is determined, the insertion loss of the to-be-tested transmission link is mainly determined by the physical characteristics of the to-be-tested transmission link. Therefore, it may be considered that transmission links transmitting the same type of PCIe signals, upon having the same insertion loss, may require the same bandwidth of PCIe signals.

It may be appreciated that in order to measure the target frequency point, the apparatus of the to-be-tested transmission link may also be used for experimental measurement, and the bandwidth of the PCIe signal of the to-be-tested transmission link may be accurately determined without considering the insertion loss of the to-be-tested transmission link. However, in the design stage of the to-be-tested transmission link, the cost of building an entity and testing is relatively high. Therefore, in the method for determining the PCIe signal bandwidth according to an embodiment of the present disclosure, an analog transmission link is configured to simulate the to-be-tested transmission link for testing, thereby the test cost is reduced and the test feasibility is enhanced.

In the implementations, in step S101, analog transmission links for simulating transmission links with different insertion losses are prepared in advance, and standard PCIe pseudo-random binary sequence (PRBS) signals with standard amplitude and code pattern are generated by using a code pattern generator function of a bit error rate tester. The insertion losses of the standard PCIe signals on different analog transmission links are tested and recorded, and a database is established. The parameters of the standard PCIe signal, including amplitude, code pattern, and rate and so on, are determined according to a PCIe protocol. For example, the transmission rate of a PCIe 5.0 signal is 32 Gb/s. In order to provide more referential data, the insertion losses of a plurality of standard PCIe signals on different analog transmission links may be pre-tested and recorded in step S101.

The analog transmission link may employ an inter symbol interference (ISI) board with uniqueness and standardization provided by the PCI-Sig association. A plurality of groups of transmission links (pair) of different lengths are provided on the inter symbol interference board and include those having connectors and those not having connectors, thereby facilitating the formation of a plurality of groups of standard data. Step S101 may include:

obtaining, by testing, the insertion loss of the standard PCIe signal on each transmission link of an inter symbol interference board; and taking the insertion loss on each transmission link of the inter symbol interference board as the insertion loss of the standard PCIe signal on the analog transmission link.

PCIe signals are backwards compatible, for example, a PCIe 5.0 signal may be compatible with a PCIe 4.0 signal, a PCIe 3.0 signal, and the like. In order to establish more reference data, the operation of obtaining, by testing, the insertion loss of the standard PCIe signal on each transmission link of the inter symbol interference board may be:

measuring, by a vector network analyzer (VNA), an insertion loss of each frequency point corresponding to a PCIe signal compatible with the standard PCIe signal on each transmission link of the inter symbol interference board.

Step S102 of determining the insertion loss of the to-be-tested transmission link may be: obtaining the insertion loss of the to-be-tested transmission link by simulation testing through a simulation software. An insertion loss corresponding to a high-speed link in practical engineering applications is estimated by the simulation software and relevant evaluation methods, which is regarded as the insertion loss of the to-be-tested transmission link.

For step S103, after the insertion loss of the to-be-tested transmission link is determined, according to a PCIe signal type of a PCIe signal to be transmitted by the to-be-tested transmission link, an analog transmission link with the same standard PCIe signal as the to-be-tested transmission link in the database established in step S101 is found, wherein the analog transmission link has the same insertion loss as the to-be-tested transmission link. The analog transmission link serves as a target analog transmission link for simulating the to-be-tested transmission link.

For step S104, the preset proportion is determined according to a measurement error requirement of the to-be-tested transmission link. The preset proportion is usually 99.9%, and a corresponding measurement error is less than 3%.

In the implementations, a test system composed of a bit error rate tester, a target analog transmission link, and a high-bandwidth oscilloscope is built. A standard PCIe signal corresponding to a signal type of a to-be-tested transmission link is generated by using the bit error rate tester and input into the target analog transmission link, and an output signal enters the high-bandwidth oscilloscope. At this moment, in order to obtain an accurate PCIe signal bandwidth, an oscilloscope with a larger bandwidth is selected for measurement. It is to be noted that the measurement process is different from selecting a high-bandwidth oscilloscope by a triple method in the subsequent signal integrity test of the to-be-tested transmission link. That is, after the to-be-tested transmission link is tested once, all signal tests carried out when the to-be-tested transmission link is put into production and in use may carry out accurate PCIe signal bandwidth selection, and the effects of improving measurement accuracy and reducing cost are sufficient to make up for the problem of improving test complexity caused by adding the step of measuring a target frequency point using the high-bandwidth oscilloscope at this moment.

Based on the test system, step S104 of obtaining, by testing, the target frequency point at which the energy spectrum density of the output signal, after being subjected to inverse Fourier transform, of the PCIe signal corresponding to the PCIe signal type passing the target analog transmission link reaches the preset proportion of the original signal of the PCIe signal type includes:

introducing the PCIe signal corresponding to the PCIe signal type into a high-bandwidth oscilloscope via the target analog transmission link, and capturing a testing waveform;

performing Fourier transform on the testing waveform to obtain a frequency domain envelope curve graph of the testing waveform; and based on the frequency domain envelope curve graph, measuring the target frequency point at which the energy spectrum density of the output signal, after being subjected to inverse Fourier transform, of the PCIe signal corresponding to the PCIe signal type passing the target analog transmission link reaches the preset proportion of the original signal of the PCIe signal type.

That is to say, the pseudo-random binary sequence number of the standard PCIe signal corresponding to the PCIe signal type of the to-be-tested transmission link is generated by using the code pattern generator function of the bit error rate tester as in step S101. After being transmitted through the target analog transmission link, a waveform is captured by the high-bandwidth oscilloscope, which is a testing waveform. Since the testing waveform is a time domain waveform, a frequency domain envelope curve graph of the testing waveform is obtained by performing Fourier transform on the testing waveform by using the function of the high-bandwidth oscilloscope, and then a target frequency point at which energy spectrum density, after inverse Fourier transform, reaches a preset proportion of the energy spectrum density of an original signal (namely, a pure pseudo-random binary sequence signal generated by the bit error rate tester) is measured based on the frequency domain envelope curve graph.

If the target analog transmission link is a transmission link on the inter symbol interference board, step S104 may be performed by using a test system as shown in FIG. 2. The test system includes a bit error rate tester 201, an inter symbol interference board 202, and a high-bandwidth oscilloscope 203.

The bit error rate tester 201, a target analog transmission link on the inter symbol interference board 202, and the high-bandwidth oscilloscope 203 are connected in sequence. A connector (cable) to be used is determined according to the PCIe protocol of the PCIe signal type of the to-be-tested transmission link. For example, an SMA connector (usually used for the PCIe 4.0 signal) or an MMPX connector (usually used for the PCIe 5.0 signal) may be used.

A synthesizer 204 may also be arranged between the bit error rate tester 201 and the target analog transmission link on the inter symbol interference board 202. On the premise that influence factors including an interference signal of the to-be-tested transmission link are obtained by simulation, the interference signal is synthesized in the pure pseudo-random binary sequence signal generated by the bit error rate tester 201 and then transmitted through the target analog transmission link on the inter symbol interference board 202, thereby better simulating the to-be-tested transmission link. Step S104 of obtaining, by testing, the target frequency point at which the energy spectrum density of the output signal, after being subjected to inverse Fourier transform, of the PCIe signal corresponding to the PCIe signal type passing the target analog transmission link reaches the preset proportion of the original signal of the PCIe signal type may be:

obtaining, by testing, the target frequency point at which the energy spectrum density of the output signal, after being subjected to inverse Fourier transform, of the PCIe signal corresponding to the PCIe signal type firstly being synthesized to be an interference signal by a synthesizer and then passing the target analog transmission link reaches the preset proportion of the original signal of the PCIe signal type.

In step S105, the target frequency point recorded in step S104 may be used as the bandwidth of the PCIe signal of the to-be-tested transmission link. That is, the target frequency point may be used for configuring the bandwidth of the oscilloscope when the signal integrity verification is actually performed. Based on the high-speed signal bandwidth selection method which is more accurate than the empirical method, on the one hand, when studying the signal integrity problem, a more suitable bandwidth is selected, and if the evaluated bandwidth is greater than the bandwidth required by the empirical method, the problems in circuit design may be located better, more robustly, and more reliably. On the other hand, if the evaluated bandwidth is less than the bandwidth required by the empirical rule, the signal-to-noise ratio may be better improved (because the oscilloscope is not an ideal instrument after all, and the measurement system has a ground noise), the demand for the high-bandwidth oscilloscope in the process of signal integrity verification may be effectively reduced, the problem of insufficient device resources per capita are solved, and the research and development expenditure of the company is reduced to increase economic benefits.

Compared with the related art in which a PCIe signal bandwidth is determined by the empirical method when the signal integrity test of a PCIe signal transmission link is performed, according to the method for determining the PCIe signal bandwidth provided by the present disclosure, the target frequency point at which the energy spectrum density of the output signal, after being subjected to inverse Fourier transform, of the PCIe signal of the to-be-tested transmission link passing the a PCIe signal of a to-be-tested transmission link reaches the preset proportion (determined according to a measurement error requirement of the to-be-tested transmission link) of the original signal is obtained by testing and the target frequency point is taken as a bandwidth of the PCIe signal of the to-be-tested transmission link. Therefore, accurate high-speed signal bandwidth selection is realized. Moreover, in order to achieve measuring the target frequency point, after a high-speed signal is subjected to a large link loss, a high-frequency signal received at a receiving end may be greatly suppressed. Therefore, the insertion loss of the standard PCIe signal on the analog transmission link is obtained by pre-testing, and after the insertion loss of the to-be-tested transmission link is determined, a target analog transmission link is selected to simulate the to-be-tested transmission link for testing. The test of signal bandwidth selection in the design stage of the to-be-tested transmission link is realized, and reasonable selection of the PCIe signal bandwidth is accordingly realized. Under the trend of higher PCIe signal rate, more peripheral demand configurations and more advanced production technology, facing the situation that the PCIe signal bandwidth determined by the empirical method has not matched the actual state of the PCIe signal transmission link, the PCIe signal bandwidth required by the to-be-tested transmission link may be accurately determined, and the development demands of the industry are met.

It may be appreciated that the method for determining the PCIe signal bandwidth according to an embodiment of the present disclosure may increasingly present outstanding technical effects in view of the trend of higher and higher PCIe signal rate, more and more peripheral demand configurations and more advanced production technology, especially for current PCIe 5.0 signals, PCIe 6.0 signals, and higher-rate signals that may appear in the future. Although there may be little difference from the bandwidth obtained by the empirical method, PCIe 3.0 and PCIe 4.0 signals with relatively long rise time may also play a practical role in occasions with high requirements for bandwidth accuracy.

Figure 3:
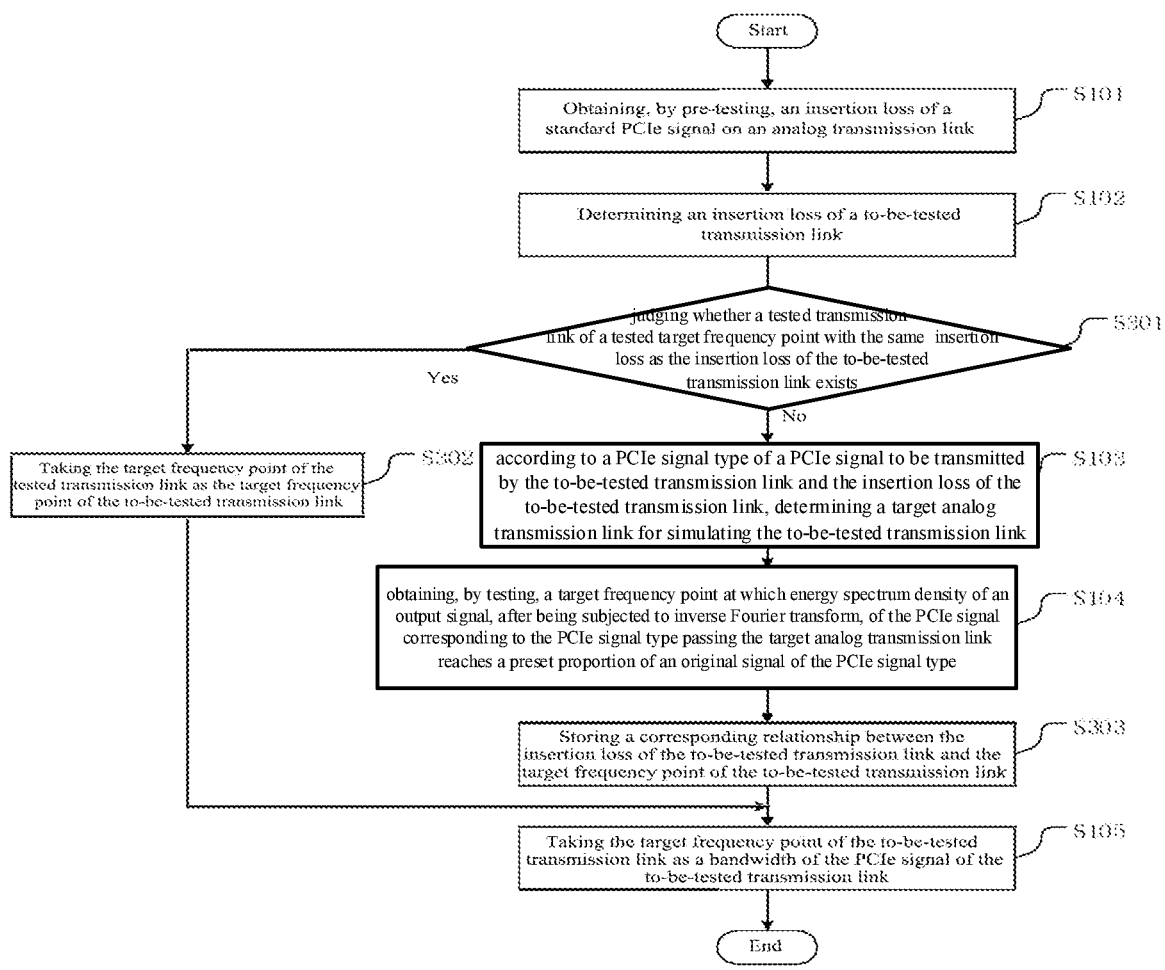
FIG. 3 is a flowchart of a method for determining the PCIe signal bandwidth according to another embodiment of the present disclosure.

FIG. 3 is a flowchart of a method for determining the PCIe signal bandwidth according to another embodiment of the present disclosure.

On the basis of the foregoing embodiment, as shown in FIG. 3, before step S103 of according to the PCIe signal type of the PCIe signal to be transmitted by the to-be-tested transmission link and the insertion loss of the to-be-tested transmission link, determining the target analog transmission link for simulating the to-be-tested transmission link, the method for determining the PCIe signal bandwidth according to an embodiment of the present disclosure further includes:

S301: judging whether a tested transmission link of a tested target frequency point with the same insertion loss as the insertion loss of the to-be-tested transmission link exists; when the tested transmission link of the tested target frequency point with the same insertion loss as the insertion loss of the to-be-tested transmission link exists, entering step S302; when the tested transmission link of the tested target frequency point with the same insertion loss as the insertion loss of the to-be-tested transmission link does not exist, and then entering step S103.

S302: taking the target frequency point of the tested transmission link as the target frequency point of the to-be-tested transmission link, and then entering step S105.

After step S104 of obtaining, by testing, the target frequency point at which the energy spectrum density of the output signal, after being subjected to inverse Fourier transform, of the PCIe signal corresponding to the PCIe signal type passing the target analog transmission link reaches the preset proportion of the original signal of the PCIe signal type, the method further includes:

S303: storing a corresponding relationship between the insertion loss of the to-be-tested transmission link and the target frequency point of the to-be-tested transmission link.

After the to-be-tested transmission link is put into production, it may be mass-produced, or a large number of similar transmission links appear. At this moment, the corresponding relationship between the insertion loss of the to-be-tested transmission link and the target frequency point of the to-be-tested transmission link is stored in the database together with the insertion loss of the standard PCIe signal in the analog transmission link in step S101, which is helpful to reduce the count of testing the target frequency point of the transmission link in the future.

It is to be noted that there is no order relationship between step S303 and step S105.

The various embodiments corresponding to the method for determining the PCIe signal bandwidth are described in detail above. On this basis, the present disclosure also discloses an apparatus for determining a PCIe signal bandwidth and device, and a computer-readable storage medium corresponding to the foregoing method.

Figure 4:
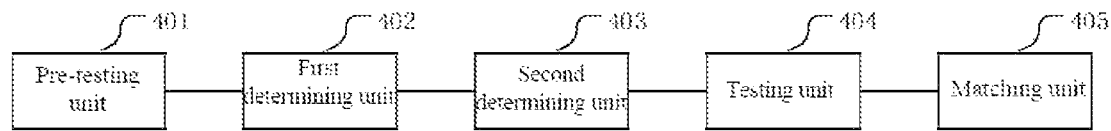
FIG. 4 is a schematic diagram showing a structure of an apparatus for determining a PCIe signal bandwidth according to an embodiment of the present disclosure.

FIG. 4 is a schematic diagram showing a structure of an apparatus for determining a PCIe signal bandwidth according to an embodiment of the present disclosure.

As shown in FIG. 4, the apparatus for determining the PCIe signal bandwidth according to an embodiment of the present disclosure includes:

a pre-testing unit 401 configured to obtain, by pre-testing, an insertion loss of a standard PCIe signal on an analog transmission link;
  a first determining unit 402 configured to determine an insertion loss of a to-be-tested transmission link;
  a second determining unit 403 configured to, according to a PCIe signal type of a PCIe signal to be transmitted by the to-be-tested transmission link and the insertion loss of the to-be-tested transmission link, determine a target analog transmission link for simulating the to-be-tested transmission link;
  a testing unit 404 configured to obtain, by testing, a target frequency point at which energy spectrum density of an output signal, after being subjected to inverse Fourier transform, of the PCIe signal corresponding to the PCIe signal type passing the target analog transmission link reaches a preset proportion of an original signal of the PCIe signal type; and
  a matching unit 405 configured to take the target frequency point of the to-be-tested transmission link as a bandwidth of the PCIe signal of the to-be-tested transmission link.

The preset proportion is determined according to a measurement error requirement of the to-be-tested transmission link.

In an embodiment of the present disclosure, the apparatus for determining the PCIe signal bandwidth according to an embodiment of the present disclosure further includes:

a judging subunit, configured to judge, before the second determining unit 403 determines, according to a PCIe signal type of a PCIe signal to be transmitted by the to-be-tested transmission link and the insertion loss of the to-be-tested transmission link, a target analog transmission link for simulating the to-be-tested transmission link, whether a tested transmission link of a tested target frequency point with the same insertion loss as the insertion loss of the to-be-tested transmission link exists; when the tested transmission link of the tested target frequency point with the same insertion loss as the insertion loss of the to-be-tested transmission link exists, enter a matching subunit, and when the tested transmission link of the tested target frequency point with the same insertion loss as the insertion loss of the to-be-tested transmission link does not exist, enter the second determining unit 403; and a matching subunit, configured to take the target frequency point of the tested transmission link as the target frequency point of the to-be-tested transmission link.

The apparatus for determining the PCIe signal bandwidth according to an embodiment of the present disclosure further includes:

a storage unit configured to store, after the testing unit 404 obtains, by testing, the target frequency point at which the energy spectrum density of the output signal, after being subjected to inverse Fourier transform, of the PCIe signal corresponding to the PCIe signal type passing the target analog transmission link reaches the preset proportion of the original signal of the PCIe signal type, a corresponding relationship between the insertion loss of the to-be-tested transmission link and the target frequency point of the to-be-tested transmission link.

Since the apparatus embodiment and the method embodiment correspond to each other, the apparatus embodiment is described with reference to the method embodiment, and may not be detailed herein.

Figure 5:
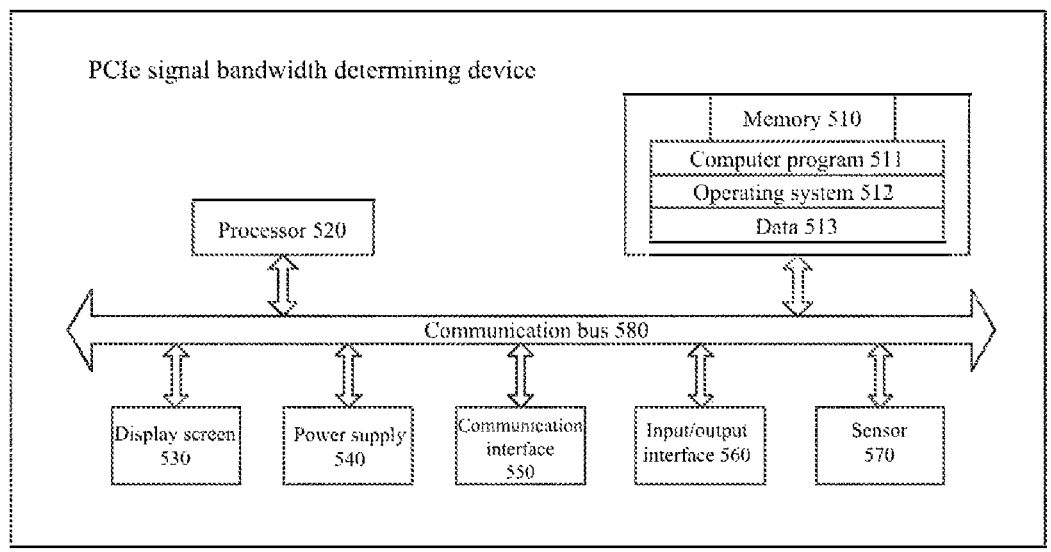
FIG. 5 is a schematic diagram showing a structure of a PCIe signal bandwidth determining device according to an embodiment of the present disclosure.

FIG. 5 is a schematic diagram showing a structure of a PCIe signal bandwidth determining device according to an embodiment of the present disclosure.

As shown in FIG. 5, a device for determining a PCIe signal bandwidth according to an embodiment of the present disclosure includes:

a memory 510, configured to store an instruction including the steps of the method for determining the PCIe signal bandwidth according to any one of the foregoing embodiments; and a processor 520, configured to execute the instruction.

The processor 520 may include one or more processing cores, for example, a 3-core processor, an 8-core processor, and the like. The processor 520 may be implemented in at least one of hardware forms: digital signal processing (DSP), field-programmable gate array (FPGA), and programmable logic array (PLA). The processor 520 may further include a main processor and a co-processor. The main processor is a processor for processing data in a wake-up state, also referred to as a central processing unit (CPU). The co-processor is a low-power processor for processing data in a standby state. In some embodiments, the processor 520 may be integrated with a graphics processing unit (GPU). The GPU is responsible for rendering and drawing content needing to be displayed by a display screen. In some embodiments, the processor 520 may further include an Artificial Intelligence (AI) processor. The AI processor is configured to process computing operations related to machine learning.

The memory 510 may include one or more computer-readable storage media, which may be non-transitory. The memory 510 may further include a high-speed random access memory, as well as a non-volatile memory, for example, one or more disk storage devices and flash storage devices. In the present embodiment, the memory 510 is at least configured to store a computer program 511. The computer program 511, after being loaded and executed by the processor 520, may implement the related steps in the method for determining the PCIe signal bandwidth disclosed in any one of the foregoing embodiments. In addition, resources stored in the memory 510 may further include an operating system 512, data 513, and the like. The storage mode may be temporary storage or permanent storage. The operating system 512 may be Windows. The data 513 may include but is not limited to data involved in the foregoing method.

In some embodiments, the PCIe signal bandwidth determining device may further include a display screen 530, a power supply 540, a communication interface 550, an input-output interface 560, a sensor 570, and a communication bus 580.

It may be appreciated by those skilled in the art that the structure shown in FIG. 5 is not limiting of the device for determining the PCIe signal bandwidth, which may include more or fewer components than illustrated.

The device for determining the PCIe signal bandwidth according to an embodiment of the present disclosure includes a memory and a processor. The processor, when executing a program stored in the memory, may implement the method for determining the PCIe signal bandwidth as described above with the same effect as above.

It is to be noted that the apparatus and device embodiments described above are merely examples. For example, division into the modules is merely logical function division, and may be other division in an actual implementation. For example, a plurality of modules or assemblies may be combined or may be integrated into another system, or some features may be ignored or not be performed. In addition, the displayed or discussed mutual couplings or direct couplings or communicative connections may be implemented by using some interfaces. The indirect couplings or communicative connections between the apparatuses or modules may be implemented in electrical, mechanical, or other forms. The modules illustrated as separate components may or may not be physically separated, and components displayed as modules may or may not be physical modules, may be, namely, located in one place, or may be distributed over a plurality of network modules. Some or all of the modules may be selected based on actual requirements to achieve the object of the solution of the present embodiment.

In addition, functional modules in the various embodiments of the present disclosure may be integrated into one processing module, each module may exist physically alone, or two or more modules may be integrated in one module. The foregoing integrated modules may be implemented either in the form of hardware or in the form of software functional modules.

The integrated modules may be stored in a computer-readable storage medium when implemented in the form of software functional modules and sold or used as stand-alone products. Based on this understanding, the technical solution of the present disclosure may be embodied in the form of a software product in essence or in part or in whole or in part of the technical solution that contributes to the related art. The computer software product is stored in a storage medium and performs all or in part of the steps of the method described in the various embodiments of the present disclosure.

To this end, an embodiment of the present disclosure also provides a computer-readable storage medium. The computer-readable storage medium stores a computer program. The computer program, when executed by a processor, implements the steps of a method for determining a PCIe signal bandwidth.

The computer-readable storage medium may include: a USB flash drive, a removable hard disk, a read-only memory (ROM), a random access memory (RAM), a magnetic disk, or an optical disk, and other media which may store program codes.

The computer program included in the computer-readable storage medium provided in the present embodiment, when executed by the processor, may implement the steps of the method for determining the PCIe signal bandwidth as described above with the same effect as above.

A method for determining a PCIe signal bandwidth, an apparatus, a device, and a computer-readable storage medium provided by the present disclosure stated above are introduced in detail. Each embodiment in the specification is described in a progressive way. Each embodiment focuses on the differences from other embodiments. The same and similar parts between embodiments may be seen in each other. For the apparatus, the device, and the computer-readable storage medium disclosed in the embodiment, because it corresponds to the method disclosed in the present embodiment, the description is relatively simple, and the relevant places may be seen in the method section. It should be noted that those skilled in the art may make modifications and variations to the present disclosure without departing from the spirit and scope of the present disclosure, and such modifications and variations shall also fall within the scope of the claims of the present disclosure.

It should also be noted that the relational terms such as "first" and "second" in the present specification are used solely to distinguish one entity or operation from another entity or operation without necessarily requiring or implying any actual relationship or order between such entities or operations. Furthermore, the terms like "include", "include", or any other variations thereof, are intended to indicate a non-exclusive inclusion, such that a process, method, article, or apparatus that includes a list of elements does not include only those elements but may include other elements not expressly listed or inherent to such process, method, article, or apparatus. An element defined by a phrase like "includes a . . . " does not, without further constraints, preclude the existence of additional identical elements in the process, method, article, or apparatus that includes the element.

The invention claimed is:

1. A method for determining a programmable communication interface extension (PCIe) signal bandwidth, comprising:
    obtaining, by pre-testing, an insertion loss of a standard PCIe signal on an analog transmission link;
    determining an insertion loss of a to-be-tested transmission link;
    according to a PCIe signal type of a PCIe signal to be transmitted by the to-be-tested transmission link and the insertion loss of the to-be-tested transmission link, determining a target analog transmission link for simulating the to-be-tested transmission link;
    obtaining, by testing, a target frequency point at which energy spectrum density of an output signal, after being subjected to inverse Fourier transform, of the PCIe signal corresponding to the PCIe signal type passing the target analog transmission link reaches a preset proportion of an original signal of the PCIe signal type;
    taking the target frequency point of the to-be-tested transmission link as a bandwidth of the PCIe signal of the to-be-tested transmission link;
    wherein the preset proportion is determined according to a measurement error requirement of the to-be-tested transmission link.

2. The method for determining the PCIe signal bandwidth according to claim 1, wherein obtaining, by testing, the insertion loss of the standard PCIe signal on the analog transmission link comprises:
    obtaining, by testing, the insertion loss of the standard PCIe signal on each transmission link of an inter symbol interference board; and
    taking the insertion loss on each transmission link of the inter symbol interference board as the insertion loss of the standard PCIe signal on the analog transmission link.

3. The method for determining the PCIe signal bandwidth according to claim 2, wherein obtaining, by testing, an insertion loss of the standard PCIe signal on each transmission link of an inter symbol interference board comprises:
    measuring, by a vector network analyzer, an insertion loss of each frequency point corresponding to a PCIe signal compatible with the standard PCIe signal on each transmission link of the inter symbol interference board.

4. The method for determining the PCIe signal bandwidth according to claim 2, wherein obtaining, by testing, the target frequency point at which the energy spectrum density of the output signal, after being subjected to inverse Fourier transform, of the PCIe signal corresponding to the PCIe signal type passing the target analog transmission link reaches the preset proportion of the original signal of the PCIe signal type comprises:
    obtaining, by testing, the target frequency point at which the energy spectrum density of the output signal, after being subjected to inverse Fourier transform, of the PCIe signal corresponding to the PCIe signal type firstly being synthesized to be an interference signal by a synthesizer and then passing the target analog transmission link reaches the preset proportion of the original signal of the PCIe signal type.

5. The method for determining the PCIe signal bandwidth according to claim 1, wherein obtaining, by testing, the target frequency point at which the energy spectrum density of the output signal, after being subjected to inverse Fourier transform, of the PCIe signal corresponding to the PCIe signal type passing the target analog transmission link reaches the preset proportion of the original signal of the PCIe signal type comprises:
    introducing the PCIe signal corresponding to the PCIe signal type into a high-bandwidth oscilloscope via the target analog transmission link, and capturing a testing waveform;
    performing Fourier transform on the testing waveform to obtain a frequency domain envelope curve graph of the testing waveform; and
    based on the frequency domain envelope curve graph, measuring the target frequency point at which the energy spectrum density of the output signal, after being subjected to inverse Fourier transform, of the PCIe signal corresponding to the PCIe signal type passing the target analog transmission link reaches the preset proportion of the original signal of the PCIe signal type.

6. The method for determining the PCIe signal bandwidth according to claim 1, wherein before, according to the PCIe signal type of the PCIe signal to be transmitted by the to-be-tested transmission link and the insertion loss of the to-be-tested transmission link, determining the target analog transmission link for simulating the to-be-tested transmission link, the method further comprises:

judging whether a tested transmission link of a tested target frequency point with the same insertion loss as the insertion loss of the to-be-tested transmission link exists;

when the tested transmission link of the tested target frequency point with the same insertion loss as the insertion loss of the to-be-tested transmission link exists, after taking the target frequency point of the tested transmission link as the target frequency point of the to-be-tested transmission link, entering the step of taking the target frequency point of the to-be-tested transmission link as the bandwidth of the PCIe signal of the to-be-tested transmission link;

when the tested transmission link of the tested target frequency point with the same insertion loss as the insertion loss of the to-be-tested transmission link does not exist, entering the step of according to the PCIe signal type of the PCIe signal to be transmitted by the to-be-tested transmission link and the insertion loss of the to-be-tested transmission link, determining the target analog transmission link for simulating the to-be-tested transmission link.

7. The method for determining the PCIe signal bandwidth according to claim 1, wherein the determining the insertion loss of the to-be-tested transmission link comprises:
obtaining the insertion loss of the to-be-tested transmission link by simulation testing through a simulation software.

8. The method for determining the PCIe signal bandwidth according to claim 1, wherein the target analog transmission link is an analog transmission link with the same standard PCIe signal as the to-be-tested transmission link, wherein the analog transmission link has the same insertion loss as the to-be-tested transmission link.

9. The method for determining the PCIe signal bandwidth according to claim 1, wherein before obtaining, by pre-testing, the insertion loss of the standard PCIe signal on the analog transmission link comprises:
preparing the analog transmission links for simulating transmission links with different insertion losses; and
generating the standard PCIe signal by using a bit error rate tester.

10. The method for determining the PCIe signal bandwidth according to claim 9, wherein after generating the standard PCIe signal by using the bit error rate tester, the method further comprises:
testing and recording the insertion losses of the standard PCIe signals on the different analog transmission links, and establishing a database.

11. The method for determining the PCIe signal bandwidth according to claim 1, wherein after obtaining, by testing, the target frequency point at which the energy spectrum density of the output signal, after being subjected to inverse Fourier transform, of the PCIe signal corresponding to the PCIe signal type passing the target analog transmission link reaches the preset proportion of the original signal of the PCIe signal type, the method further comprises:
storing a corresponding relationship between the insertion loss of the to-be-tested transmission link and the target frequency point of the to-be-tested transmission link.

12. A device for determining a PCIe signal bandwidth, comprising:
a memory configured to store an instruction comprising the steps of the method for determining the PCIe signal bandwidth according to claim 1; and
a processor configured to execute the instruction.

13. The device for determining the PCIe signal bandwidth according to claim 12, wherein obtaining, by testing, the insertion loss of the standard PCIe signal on the analog transmission link comprises:
obtaining, by testing, the insertion loss of the standard PCIe signal on each transmission link of an inter symbol interference board; and
taking the insertion loss on each transmission link of the inter symbol interference board as the insertion loss of the standard PCIe signal on the analog transmission link.

14. The device for determining the PCIe signal bandwidth according to claim 13, wherein obtaining, by testing, an insertion loss of the standard PCIe signal on each transmission link of an inter symbol interference board comprises:
measuring, by a vector network analyzer, an insertion loss of each frequency point corresponding to a PCIe signal compatible with the standard PCIe signal on each transmission link of the inter symbol interference board.

15. The device for determining the PCIe signal bandwidth according to claim 13, wherein obtaining, by testing, the target frequency point at which the energy spectrum density of the output signal, after being subjected to inverse Fourier transform, of the PCIe signal corresponding to the PCIe signal type passing the target analog transmission link reaches the preset proportion of the original signal of the PCIe signal type comprises:
obtaining, by testing, the target frequency point at which the energy spectrum density of the output signal, after being subjected to inverse Fourier transform, of the PCIe signal corresponding to the PCIe signal type firstly being synthesized to be an interference signal by a synthesizer and then passing the target analog transmission link reaches the preset proportion of the original signal of the PCIe signal type.

16. The device for determining the PCIe signal bandwidth according to claim 12, wherein obtaining, by testing, the target frequency point at which the energy spectrum density of the output signal, after being subjected to inverse Fourier transform, of the PCIe signal corresponding to the PCIe signal type passing the target analog transmission link reaches the preset proportion of the original signal of the PCIe signal type comprises:
introducing the PCIe signal corresponding to the PCIe signal type into a high-bandwidth oscilloscope via the target analog transmission link, and capturing a testing waveform;
performing Fourier transform on the testing waveform to obtain a frequency domain envelope curve graph of the testing waveform; and
based on the frequency domain envelope curve graph, measuring the target frequency point at which the energy spectrum density of the output signal, after being subjected to inverse Fourier transform, of the PCIe signal corresponding to the PCIe signal type passing the target analog transmission link reaches the preset proportion of the original signal of the PCIe signal type.

17. The device for determining the PCIe signal bandwidth according to claim 12, wherein before, according to the PCIe signal type of the PCIe signal to be transmitted by the to-be-tested transmission link and the insertion loss of the to-be-tested transmission link, determining the target analog transmission link for simulating the to-be-tested transmission link, the method further comprises:

judging whether a tested transmission link of a tested target frequency point with the same insertion loss as the insertion loss of the to-be-tested transmission link exists;

when the tested transmission link of the tested target frequency point with the same insertion loss as the insertion loss of the to-be-tested transmission link exists, after taking the target frequency point of the tested transmission link as the target frequency point of the to-be-tested transmission link, entering the step of taking the target frequency point of the to-be-tested transmission link as the bandwidth of the PCIe signal of the to-be-tested transmission link;

when the tested transmission link of the tested target frequency point with the same insertion loss as the insertion loss of the to-be-tested transmission link does not exist, entering the step of according to the PCIe signal type of the PCIe signal to be transmitted by the to-be-tested transmission link and the insertion loss of the to-be-tested transmission link, determining the target analog transmission link for simulating the to-be-tested transmission link;

after obtaining, by testing, the target frequency point at which the energy spectrum density of the output signal, after being subjected to inverse Fourier transform, of the PCIe signal corresponding to the PCIe signal type passing the target analog transmission link reaches the preset proportion of the original signal of the PCIe signal type, the method further comprises:

storing a corresponding relationship between the insertion loss of the to-be-tested transmission link and the target frequency point of the to-be-tested transmission link.

18. The device for determining the PCIe signal bandwidth according to claim 12, wherein the determining the insertion loss of the to-be-tested transmission link comprises:

obtaining the insertion loss of the to-be-tested transmission link by simulation testing through a simulation software.

19. The device for determining the PCIe signal bandwidth according to claim 12, wherein the target analog transmission link is an analog transmission link with the same standard PCIe signal as the to-be-tested transmission link, wherein the analog transmission link has the same insertion loss as the to-be-tested transmission link.

20. A non-transitory computer-readable storage medium storing a computer program thereon, wherein when executed by a processor, the computer program implements the steps of the method for determining the PCIe signal bandwidth according to claim 1.

* * * * *